United States Patent [19]

Nikkel

[11] Patent Number: 4,787,954

[45] Date of Patent: Nov. 29, 1988

[54] VACUUM TUBE HOLDER FOR CORRUGATING MACHINES

[75] Inventor: Willem A. Nikkel, Covington, Va.

[73] Assignee: Westvaco Corporation, New York, N.Y.

[21] Appl. No.: 149,484

[22] Filed: Jan. 28, 1988

[51] Int. Cl.[4] .......................... B29C 53/22; B31F 1/20

[52] U.S. Cl. .................................... 156/459; 156/462; 156/473; 425/369; 493/463

[58] Field of Search ............... 156/205, 206, 459, 462, 156/550, 470, 471, 472, 473; 425/405.1, 369, 394; 493/463

[56] References Cited

U.S. PATENT DOCUMENTS

| | | | |
|---|---|---|---|
| Re. 31,138 | 2/1983 | Tokuno | 156/473 |
| 1,981,338 | 11/1934 | Swift | 156/470 |
| 2,068,155 | 1/1937 | Swift | 156/473 |
| 4,251,313 | 2/1981 | Abe | 156/473 |
| 4,368,094 | 1/1983 | Mayer et al. | 156/462 |
| 4,368,094 | 1/1983 | Mayer et al. | 156/462 |
| 4,381,212 | 4/1983 | Roberts | 156/473 |

FOREIGN PATENT DOCUMENTS 42-615 1/1967 Japan .

*Primary Examiner*—Willard Hoag

*Attorney, Agent, or Firm*—W. A. Marcontell; R. L. Schmalz

[57] ABSTRACT

Apparatus for forming and fabricating single-faced paperboard, the lower corrugating roll is provided with numerous circumferential grooves which are partially evacuated beneath a traveling overlayment of paper web for the purpose of holding the web tightly against the corrugated roll profile. These grooves are evacuated by groove evacuation tubes connected with one or more vacuum manifolds. Such evacuation tubes have flared, tubular distal ends to match the slotted socket of respective tube holders. Each holder also includes a spring loaded mandrel to secure each tube in its respective socket in such a manner as to permit rapid removal and replacement of such tubes.

9 Claims, 2 Drawing Sheets

VACUUM TUBE HOLDER FOR CORRUGATING MACHINES

BACKGROUND OF THE INVENTION

1. Field of the Invention

The present invention relates to the art of fabricating corrugated paper or plastic board. More particularly, the present invention represents an improvement in mounting and connecting the numerous vacuum tubes on a fingerless corrugating machine which are used to evacuate the circumferential hold-down grooves in a lower corrugating roll surface.

2. Prior Art

Single-faced corrugated plastic or paper board is traditionally fabricated in a cooperating 3-roll set which includes two fluted surface rolls and a smooth surface roll. The two fluted rolls are aligned and positioned for meshing flute rotation. A continuous web of paper is drawn into the meshing nip of the two fluted rolls to be formed by pressure and heat into an undulating continuum.

Upon emergence from the meshing flute nip, the corrugated web is held tightly against the fluted profile of one of the fluted rolls, called the "lower corrugating roll," and carried about an arcuate transition zone to a second nip position corresponding with the smooth surface roll. Here, a second, flat web is drawn into this second nip to be adhesively bonded along the crest line of each flute. The resulting product is called "single-faced board."

In the arcuate transition zone between the first, corrugating nip and the second, single-facing nip, it is necessary to hold the corrugated web, by some positive confining means, tightly against the lower corrugating roll surface profile. The currently preferred confining means is by an induced pressure differential. Numerous, thirty to fifty, circumferential grooves are cut into the fluted surface profile of the lower corrugating roll. From the side of the roll opposite from the arcuate transition zone, two vacuum tubes are inserted in each groove; one on each diametric side of the groove. By means of a conduit connected vacuum pump, these tubes partially evacuate the atmosphere between the corrugated web and the roll surface profile. The pressure of the external atmosphere consequently presses the web tightly against the lower corrugating roll fluted profile surface.

In the course of single-faced board production, these vacuum tubes are quickly worn or damaged to require frequent replacement. Since the entire machine is hot and crowded, tube replacement is a hazardous, tedious manual task sometimes requiring the rotation of a tubing nut such as that disclosed by U.S. Pat. No. 4,368,094 to Johann Mayer et al. A few installations rely upon quick connecting fluid couplings which require a machined vacuum tube tip portion for insertion into the coupling housing. Due to the frequency of replacement and the cost of machine working, this technique represents an extravagant solution to the tube replacement problem.

It is, therefore, an objective of this invention to provide an inexpensive means for rapid assembly and disassembly of corrugating machine vacuum tubes.

Another object of the present invention is to provide an inexpensively fabricated vacuum tube.

Another object of the present invention is to provide a vacuum tube holder that securely sockets the tube without threaded fasteners or machined surfaces.

SUMMARY

These and other objects of the invention are provided by a vacuum tube holder respective to each vacuum tube. The holder has a slotted socket receiver compatible with a flanged vacuum tube end. A spring loaded, chamfered mandrel, slidable axially within a confining cylindrical bore in the holder body, bears against the upper face of a positioned tube flange to secure it in the holder socket. Internally, the sliding mandrel is bored with an axial conduit for fluid flow therethrough and into a vacuum manifold or other evacuated pressure zone. Externally, the holder mandrel is provided with a tool shoulder to which a fork tool may be mated for displacing the mandrel into the holder cylinder bore against the bias of the loading spring. With the mandrel displaced, the respective vacuum tube may be lifted from the holder socket and replaced by a new or reconditioned tube.

DESCRIPTION OF THE DRAWINGS

Relative to the drawings wherein like reference characters designate like or similar elements throughout the several figures of the drawings.

PREFERRED EMBODIMENT

Figure 1:
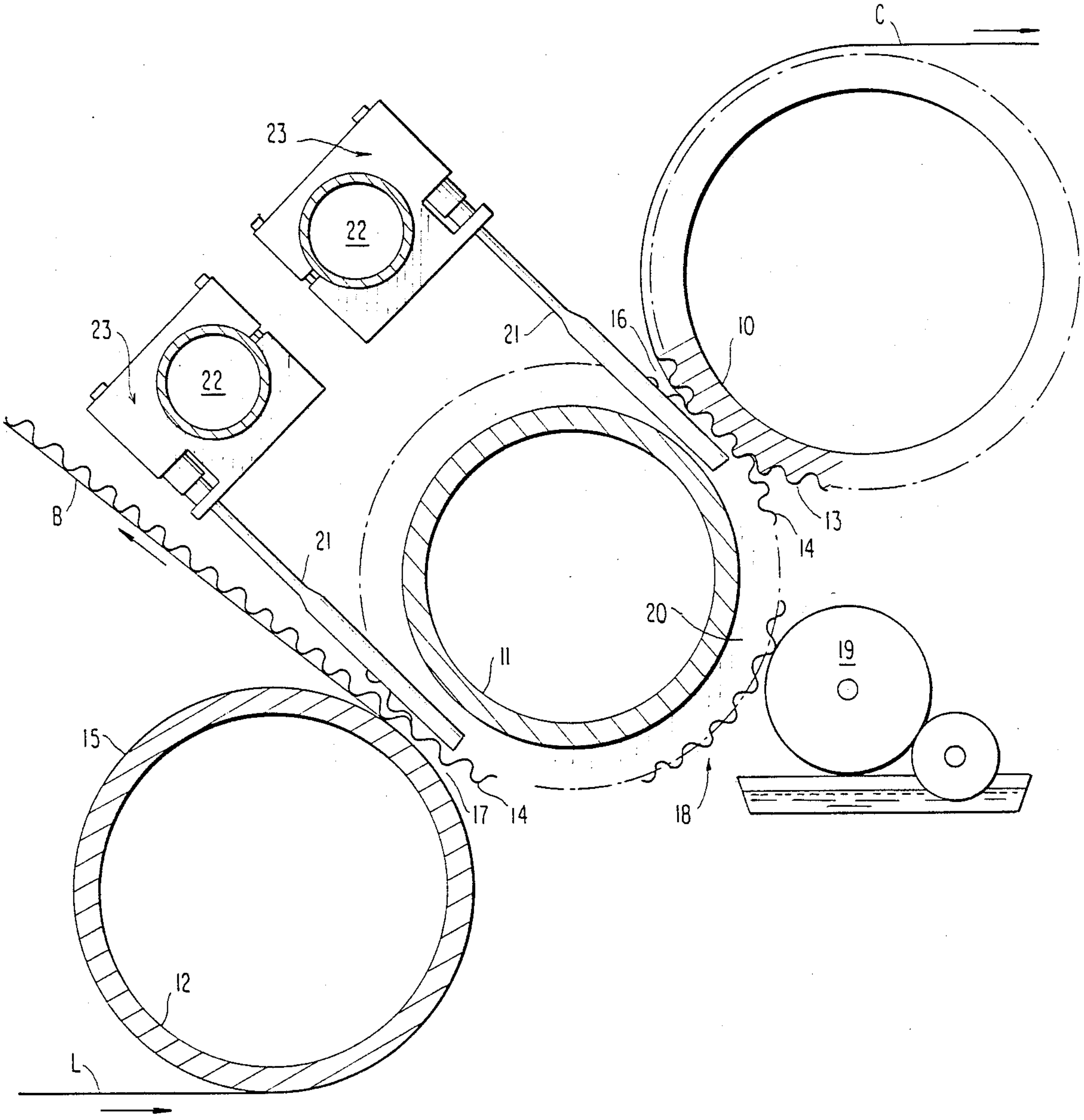
FIG. 1 is a partial section elevation of the basic corrugating machine elements.

The utility and operating environment of the present invention is seen from FIG. 1 which illustrates the three basic roll elements of a corrugating machine to be an upper corrugating roll 10, a lower corrugating roll 11 and a pressure roll 12. Each of these rolls is hollow for the purpose of receiving heating steam flow and providing a hot outer surface which makes the paper or plastic processed thereby more pliable. Upper and lower corrugating rolls 10 and 11 have a longitudinally fluted surface profile 13 and 14, respectively, whereas the pressure roll has a smooth, cylindrical surface 15. The three rolls are aligned with parallel rotational axes so that the longitudinal flutes 13 and 14 of the two corrugated surface rolls mesh in a first nip 16 with rotation. A second nip 17 occurs between the cylindrical surface elements of the pressure roll 12 and the longitudinal crests of the lower corrugating roll flutes 14.

Entering these two nips 16 and 17 are two separate continuous web supplies C and L which may be either paper or plastic. Web C is drawn over a portion of the upper corrugating roll surface for heat transfer and is formed into an undulating continuum by the pressure and stress of meshing nip 16. This shape is retained by forced confinement against the lower corrugating roll surface profile as the corrugated web C is carried over the arcuate transition zone 18 between the first nip 16 and the second nip 17.

Single-facing liner web L is drawn with a partial, heat transfer, wrap over smooth surface pressure roll 12 into a second nip 17 with the flute crests of lower corrugating roll 11. When the medium is paper, adhesive is applied to the flute crest portions of the corrugated web C by an adhesive applicator roll 19. Not all plastic web materials require adhesive to bond the liner web L to the crests of corrugated web C: heat and pressure of the second nip 17 fusion welds the respective webs. In either case, however, the liner web L is joined with the corrugated web C along the flute crests in the second nip 17 to produce the resulting single-faced board product B.

The state-of-the-art means for confining the corrugated web C against the fluted profile of lower corrugating roll 11 over the arcuate transition zone 18 is by pressure differential. Along the length of lower corrugating roll 11 at uniformly spaced intervals, of 5 to 10 cm, narrow, circumferential grooves 20 are cut into the surface of roll 11 below the roots of flutes 14. Penetrating these grooves 20 from the diametric side of the roll 11 opposite from the arcuate transition zone 18 are two vacuum tubes 21: one on each diametric side of each groove. These tubes 21 are hollow conduits connected with vacuum manifolds 22 to draw the atmosphere from the groove 20 volume beneath the corrugated web C. Resultantly, the greater external pressure bearing on the outer surface of corrugated web C uniformly presses the web tightly against the fluted surface profile of the roll 11.

Figure 2:
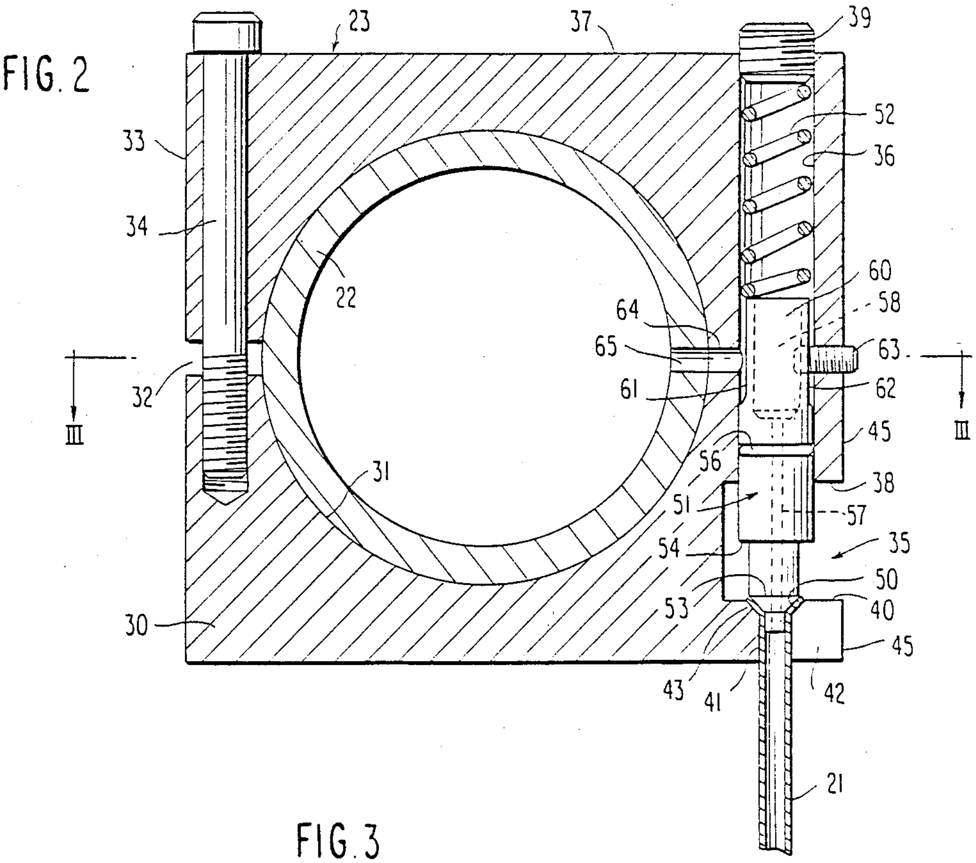
FIG. 2 is in elevational section view of a vacuum tube holder pursuant to the present invention as taken along cutting plane II—II of FIG. 3.
Figure 4:
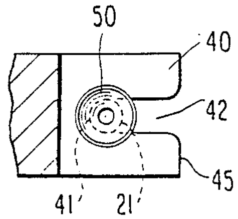
FIG. 4 is a partial, plan section of the tube socket portion of the holder body.

Due to a high rate of repair and replacement, vacuum tubes 21 as used with the present invention may be fabricated by the corrugating machine operator from standard dimension tube stock. In this case, a section of tubing is cut to length and one end partially flattened against a removable bar mandrel. The other end of a present invention vacuum tube is expanded into a flared flange 50 (FIGS. 2 and 4). Both processes are rapidly executed with cold tubing stock using common millwright tools.

As described for this preferred embodiment, two vacuum manifolds 22 are provided per machine: one for each diametric line of tubes 21. Obviously, countless other configurations are available such as the use of only one manifold 22 to serve all tubes. In this embodiment, vacuum tube holder assemblies 23 respective to each vacuum tube 21 are directly mounted on the manifold conduits. A vacuum flow channel from the tube 21 into the manifold 22 is entirely internal of the holder body. Alternatively, however, the holder assemblies may be secured to a structural mounting bar not shown with external piping to connect the holder body vacuum channel with the vacuum manifold.

Figure 3:
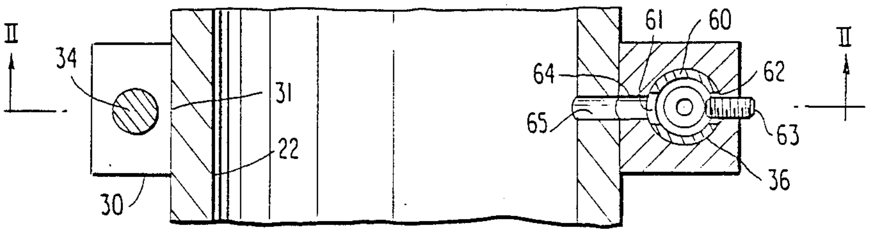
FIG. 3 is a plan section view of the present invention as taken along cutting plane III—III of FIG. 2.

Referring now to FIGS. 2–5 for a detailed description of the holder assembly 23, each is based upon a block body 30 of relatively narrow width (see FIG. 3). Across this width is bored an aperture 31 to receive the manifold pipe 22. The block 30 web is slotted 32 between the aperture 31 and outer block edge 33 to facilitate installation of the block over the manifold pipe 22 and to clamp the block tightly in place about the pipe 22 by means of a cap screw 34.

On the opposite side of the block 30 from the aperture 31 is a window slot 35 transversely of the block width and throughbore 36 parallel to the block edge. Throughbore 36 extends between outer block edge 37 and the upper edge 38 of window 35. The opening of throughbore 36 at the outer block edge 37 is sealed by means of a threaded plug 39.

The lower edge 40 of window 35 is bored 41 coaxially with the throughbore 36 to an inside diameter the same or slightly larger than the outside diameter of vacuum tube 21. This bore 41 is opened to the block edge 45 with a slot 42 for lateral insertion of a tube 21 to the bore 41 back-wall. At the lower window edge face 40, the bore 41 is chamfered with a conical relief 43 to socket the tube flare 50.

Slidably inserted into the cylindrical bore 36 is a circular section mandrel 51. A compression spring 52 loaded between the bore plug 39 and the inner end of the mandrel 51 provides resilient force bias to press a pintle tip 53 portion of the mandrel tightly against the flared tubing flange 50. Between the pintle tip 53 and body section of the mandrel 51 is a step-shoulder 54 to receive a forked extraction tool 55 having a tool handle 56.

Along the throughbore 36 enclosed length of the mandrel 51 is an O-ring and groove fluid seal 56. Coaxially of the mandrel 51 axis is a vacuum flow conduit 57 and a counterbored chamber 58. The annular shell portion 60 of the mandrel body between the outer cylindrical surface of the mandrel and the chamber 58 is slotted with openings 61 and 62. Slot 62 receives a penetrating portion of a threaded guide pin 63 to secure the rotational orientation of the mandrel while simultaneously permitting limited axial reciprocation. Slot 61 provides a fluid channel between the chamber 58 and aligned conduits 64 and 65 in the body block and manifold, respectively.

Normal corrugating operations are performed with the present invention in the condition illustrated by FIGS. 1 and 2. The vacuum tube lower ends are inserted into the lower corrugating roll vacuum drafting grooves 20. The upper flared flange 50 ends of the tubes 21 are seated in the chamfered socket 43 of the holder body 30. Compression spring 53 bears upon the end of the mandrel shell 60 to press the mandrel pintle tip 53 into tight, sealing contact with the flange flare 50. In place, a fluid tight, vacuum draft conduit is completed between the corrugating roll grooves 20 and the manifold 22.

Figure 5:
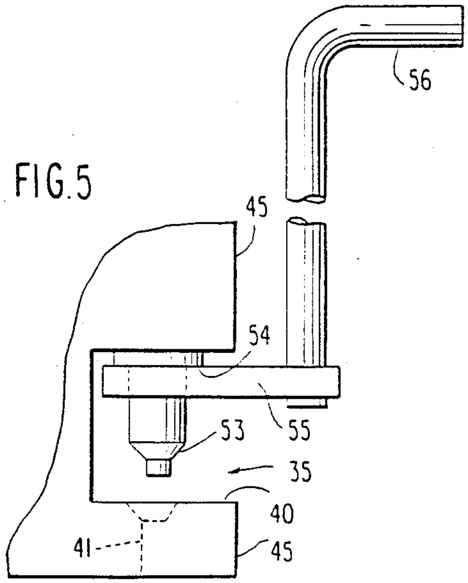
FIG. 5 is an elevational detail showing the holder mandrel in a retracted position held by an extraction tool.

Upon need for replacing a vacuum tube 21, the forked tool 55 is positioned about the mandrel beneath the step-shoulder 54 and lifted against the bias of spring 52 as illustrated by FIG. 5. This movement withdraws the mandrel pintle tip 53 from the flange flare 50 of tube 21 and permits lateral removal of the tube from the socket 43 through the access slot 42. With the worn tube 21 removed, replacement with a new or reconditioned tube is accomplished by reversing the process.

Having fully described my invention I claim:

1. A web corrugating machine having a vacuum system for securing a corrugated web to the corrugated surface profile of a fluted roll comprising:

(a) a plurality of circumferential slots in said corrugated surface extending to a depth below trough portions of corrugation flutes;

(b) vacuum drafting tubes, each having a pickup end positioned in said troughs approximately tangent thereto and a socket end having a flared tube wall; and, (c) holding means having a slotted socket for receiving the socket end of one of said vacuum tubes and resiliently biased mandrel means for holding said vacuum tube socket end aligned in said socket, said mandrel means including vacuum conduit means therein connected with a vacuum source means for drafting a vacuum from said tube through said conduit means.

2. A web corrugating machine as described by claim 1 wherein said mandrel means includes a pintle tip for seating within said socket end flare, said conduit means extending through said pintle tip.

3. A web corrugating machine as described by claim 2 wherein said holding means comprises a structural body having an axial bore therein for slidably receiving said mandrel means.

4. A web corrugating machine as described by claim 3 wherein said mandrel means includes a tool abutment shoulder for selectively moving said pintle tip away from said socket end against the force of said resilient bias and removal of said tube from said holding means socket.

5. A web corrugating machine as described by claim 4 wherein said vacuum system includes vacuum manifold means and said holding means includes vacuum manifold mounting means, said vacuum conduit means including a vacuum flow channel through said mandrel means and said axial bore into said vacuum manifold means.

6. A vacuum tube holder for positionally securing vacuum drafting tubes on a web corrugating machine, said holder comprising:

(a) a structural body having a cylindrical bore opening therein along a bore axis;
(b) an axially reciprocable, resiliently biased, cylindrical mandrel means slidably received coaxially within said cylindrical bore, said mandrel means including a pintle tip end and a vacuum flow channel along the cylindrical axis thereof; and,
(c) socket means in said structural body for securing the position of a flared tube end in coaxial alignment with said bore axis at the pintle tip end of said mandrel means.

7. A vacuum tube holder as described by claim 6 wherein said socket means includes an access slot for lateral positionment of a tube end.

8. A vacuum tube holder as described by claim 6 wherein said mandrel means comprises a tool abutment shoulder for selectively moving said pintle tip away from said socket means against the force of said resilient bias.

9. A vacuum tube holder as described by claim 6 wherein said structural body comprises mounting means for securing said body to a vacuum conduit and vacuum communication means within said body to connect said vacuum flow channel with said vacuum conduit.

* * * * *